Dec. 30, 1941.  M. G. BELL  2,268,238
COLOR VIEWING DEVICE
Filed Oct. 30, 1940

INVENTOR
M. G. BELL

BY Olew E Bee
ATTORNEY.

Patented Dec. 30, 1941

2,268,238

UNITED STATES PATENT OFFICE 2,268,238

COLOR VIEWING DEVICE

Maurice G. Bell, Detroit, Mich., assignor to Pittsburgh Plate Glass Company, Allegheny County, Pa., a corporation of Pennsylvania Application October 30, 1940, Serial No. 363,477

2 Claims. (Cl. 35—53)

The present invention relates to color viewing devices, and more particularly to articles which depict the varying colors, translucence and opaqueness occasioned by varying thicknesses of a material.

One object of the invention is to provide a color viewing device from which it will be possible to ascertain the color, translucency and general appearance resulting from a particular thickness of a given material.

Other objects and advantages of the invention will become more apparent from the following detailed description of a preferred embodiment thereof.

Where it is desired to gauge accurately the color of a certain depth of colored material, it is generally necessary to form the material into the exact thickness in a small sample. The greatest knowledge of optics, physics and the like will not permit a prediction of the color which will ordinarily be obtained. Accordingly, manufacturers or distributors producing and handling a wide range of colors in plastics, glass and similar materials prepare samples from which a prospective customer may select the particular color most suited for his purposes. These color samples are generally of uniform thickness and little attention is paid to the possibility of the color varying with different thicknesses of the colored material. Of course it is possible to superpose a plurality of the colored samples and thus estimate the color value which will be obtained from the greater thickness, but this method is not accurate, since the samples cannot be placed one upon another in such manner that true inter faces are obtained and the transmitted light will be refracted and reflected from these inter faces with a resulting distortion of the viewed color value.

Briefly stated, the present invention contemplates the formation in a unitary color viewing device of a plurality of contiguous plane areas of graduated thicknesses. For ease of handling, the continuous plane areas are triangular in form but it is not intended to restrict the invention to this design alone.

Figure 1:
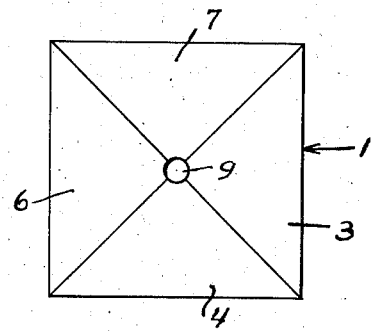
Figure 2:
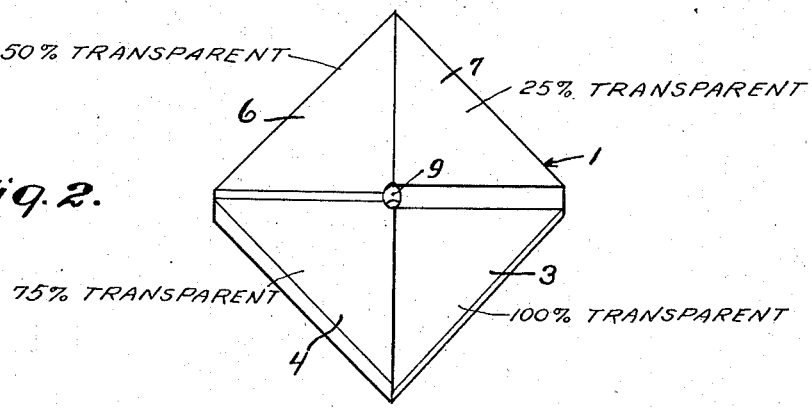
Figure 3:
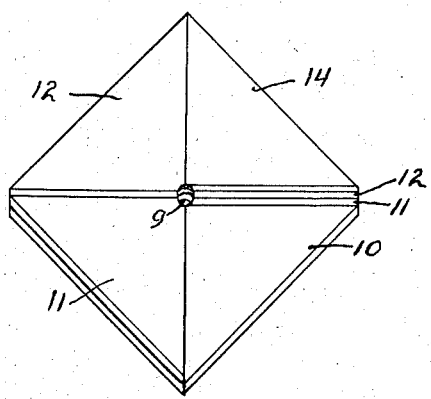
Figure 4:
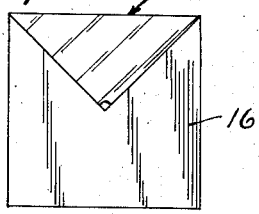

In the drawing Figure 1 is a plan view of a device as contemplated by my invention; Figure 2 is an isometric view of the device; Figure 3 is an isometric view of another form of the device and Figure 4 is a plan view of the device encased in an envelope.

Referring to the drawing, a color viewer 1 formed of plastic, glass or similar material is provided with a plane area 3 of a single thickness of the material. A contiguous area 4 is of greater thickness than the area 3 and will therefore possess a greater density of color than the area 3. A succeeding area 6 is of greater thickness and has a different color value than the area 4 and an area 7 has a greater thickness and a different color value than the area 6. As shown in Figure 1, the color viewer is in the form of a substantially square body and the contiguous plane areas are triangular in form. An opening 9 is provided in the center of the body 1, in order that a plurality of the color viewers may be strung together.

It is contemplated to form a color viewing device in one piece by a casting operation or if a colored plastic is being treated the material may be injected or compressed in a suitable mold. It is, however, possible to form the device from a plurality of sections of the material which are cemented or otherwise secured together.

As shown in Figure 3, the color device comprises a base plate 10 which is substantially square and superposed thereon is a plate 11 from which one triangular section has been removed. A half size plate 12, that is half of a square severed diagonally is superposed upon the plate 11 and a quarter size plate 14 is superposed upon the plate 12. The several plates are assembled and secured together by a suitable cement forming a device in which succeeding triangular areas are of increasing thickness.

As shown in Figure 4 an envelope 16 of paper or some opaque material, such as leather, plastic, etc. open at the top and having a ¼ section removed therefrom, may be used in combination with the color viewing device, in order that a single triangular area of the device may be exposed to view. In this manner the color of a single section may be properly evaluated without confusion or influence from the contiguous sections.

It will at once be obvious that various modifications in the nature of the materials employed, their formation into the device and the arrangement of the plane areas are possible without departing from the spirit of the invention or the scope of the appended claims.

What I claim is:

1. A color viewing device comprising a colored body in plate form having adjacent defined sections each of uniform thickness, said sections being of different thickness from one another and being optically distinguishable.

2. In combination, a color viewing device comprising a substantially square body in plate form having adjacent sections each of uniform thickness, said defined sections being of different thickness from one another and being optically distinguishable, and a substantially opaque envelope normally holding the body and having a notched portion with which any of the sections is registerable.

MAURICE G. BELL.